INVENTOR.
GARY A. MESSERLY
WAYNE H. ROYER
BY Otto Moeller
Attorney

INVENTOR.
GARY A. MESSERLY
WAYNE H. ROYER
BY
Otto Moeller
Attorney

INVENTOR.
GARY A. MESSERLY
WAYNE H. ROYER
BY Otto Moeller
Attorney

United States Patent Office 3,384,218
Patented May 21, 1968

3,384,218
ARTICLE CONVEYING AND TRANSFER
APPARATUS
Gary A. Messerly and Wayne H. Royer, York, Pa., assignors to Read Corporation, a corporation of Delaware
Filed Feb. 27, 1967, Ser. No. 618,952
10 Claims. (Cl. 198—23)

ABSTRACT OF THE DISCLOSURE

A normally horizontal intermittently operated endless chain conveyor bed transports successive transverse rows of articles along its top run to its forward end adjacent the upright run of a continuously traveling endless tray conveyor. Continuously operated endless chains disposed below the top run of the chain conveyor bed and at opposite sides thereof carry in fixed relation therewith a plurality of laterally spaced pusher fingers extending inwardly of the chain loops. The lower runs of the pusher chains travel toward the tray conveyor and the pusher fingers are of such extent that when traveling along the lower runs of the pusher chains they project between the chains of the chain conveyor bed above the level of the top run of the chain conveyor bed to push successive rows of articles from the forward end of the chain conveyor bed onto successive trays of the tray conveyor. The chain conveyor bed and pusher chains are oscillatably mounted, sloping downwardly to meet successive oncoming trays and moving in coincidence with the tray to horizontal position during which the pusher fingers push the row of articles from the chain bed conveyor onto the tray.

*Background of the invention*

The invention relates to article transporting apparatus including longitudinally traveling cooperating conveying and pushing means for advancing and transferring successively received transverse rows of articles onto successive trays of an adjacently disposed upright run of an endless tray conveyor.

Apparatus of the type described finds particular application in automated bakeries in which successive rows of pans of proofed dough are transported in a straight line between the confronting spaced discharge end of a dough proofer and the receiving end of an oven.

*Summary of the invention*

In apparatus of the type described, it is desirable to dispose the operating means for the pusher including the endless chains carrying the pusher fingers, below the pan conveying run of the chain bed conveyor so that the space above the chain bed conveyor is free and unencumbered, and wherein the pusher fingers at the end of their pan pushing stroke are retracted from engagement with the pans as they move from the forwardly traveling to the return runs of the chains, the pusher fingers on their return run passing beneath a succeeding row of pans advanced by the chain bed conveyor. In such prior apparatus it has been customary to employ a carriage for supporting the pusher means that is pivotally carried by the chains for relative movement with respect thereto, the carriage including follower rollers trapped between longitudinally extending guide tracks for guidingly supporting the pusher means during its forward and rearward travel and controlling its relative movement with respect to its supporting chains as the pivotally mounted ends of the carriage move from one to the other of the runs of the chains. It is an object of the invention to provide a simplified, more economically manufactured and more reliable smoother operating apparatus of the type described wherein the pusher means is connected in substantially fixed relation with the operating chains and in which follower rollers, guide tracks and supports therefore for controlling the path of movement of the pusher means is eliminated.

It is another object to provide an improved in line conveying and transfer apparatus between the confronting discharge end of a proofer and the loading end of an oven for transporting successive rows of pans of proofed dough from the proofer to the oven and transferring them onto successive trays of a continuously operating oven tray conveyor, to thereby provide for the higher production rates demanded in present day commercial bakeries, and to minimize wear on the tray conveying chains, sprockets and other elements incident to conventional intermittent operation of the oven tray conveyor. More specifically, it is an object to provide in such apparatus a construction and relation of elements in which the chain conveyor bed and the pusher means of the conveying and transfer apparatus are oscillatably mounted for swinging movement between a downwardly sloping and a horizontal position to meet an oncoming oven tray and to move in coincidence with the tray, the pusher means operating continuously in timed relation with the tray conveyor to transfer successive rows of pans of dough disposed on the discharge end of the intermittently operated chains of the chain conveyor bed in position to be transferred by the pusher means from the chain conveyor bed onto successive trays during such coincidental movement, to thereby effect a smooth transfer of the pans of proofed dough.

Another object is to provide conveying and transfer apparatus of the type described above, wherein intrusion of the chains of the chain bed conveyor into the baking chamber of the oven is obviated and interfingering of the chains with the tines of the trays of the continuously operating tray conveyor during transfer of the pans from the chain bed conveyor to the trays is obviated. Thus the tray tines, which are of relatively small diameter can be closely spaced to prevent dropping therebetween of the depressed portions of pans such as frankfurter roll pans, without danger of being snagged by the chains of the chain bed conveyor, which chains as a practical matter are considerably wider than the diameter of the tray tines.

Other objects and advantages of the invention will be hereinafter pointed out or will become apparent from the following description taken in conjunction with the accompanying drawings.

*Description of the preferred embodiment*

Figure 1:
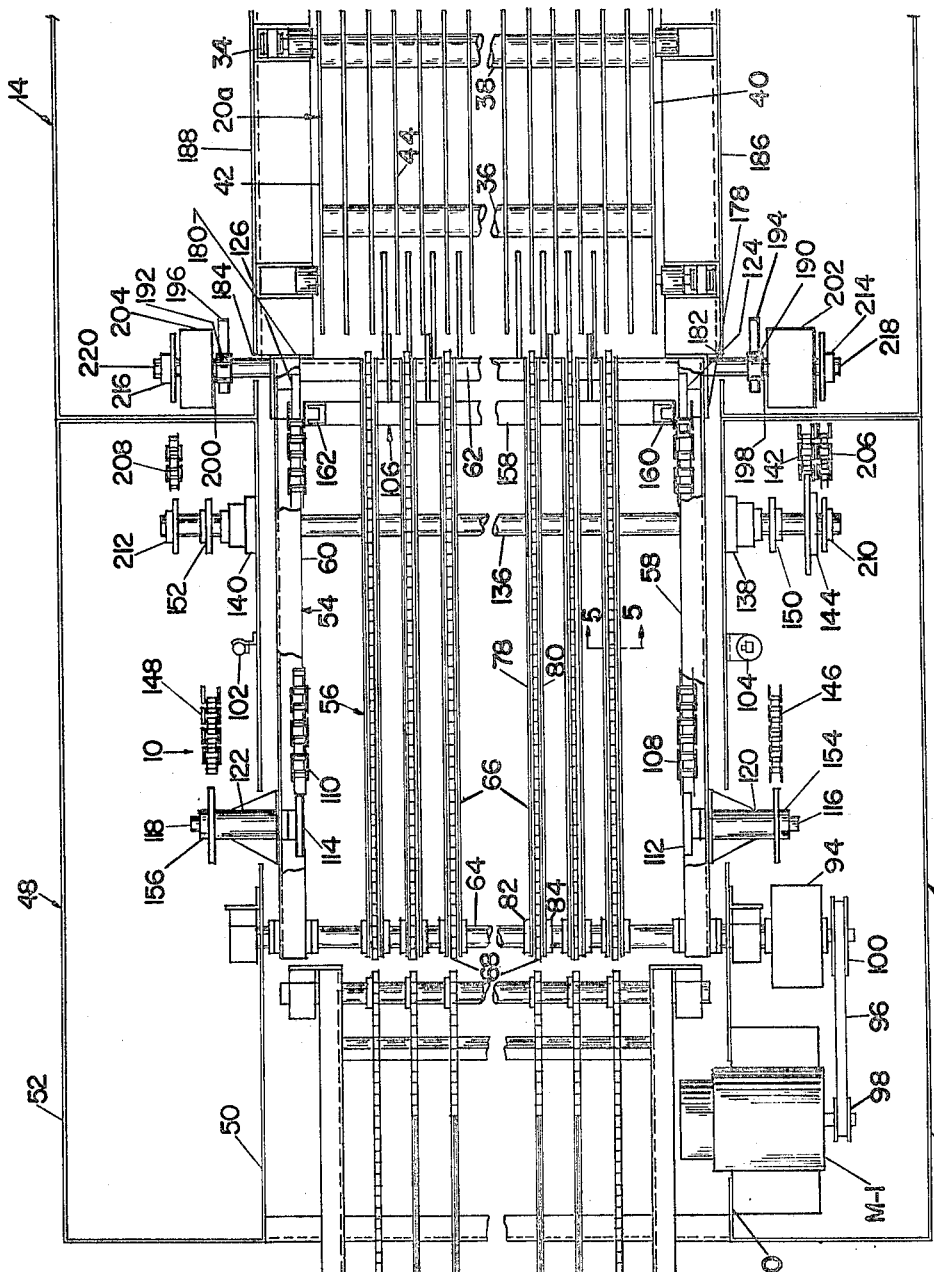
FIGURE 1 is a plan view of the conveying and transfer apparatus as applied to the confronting spaced discharge and receiving ends of a proofer and an oven.
Figure 2:
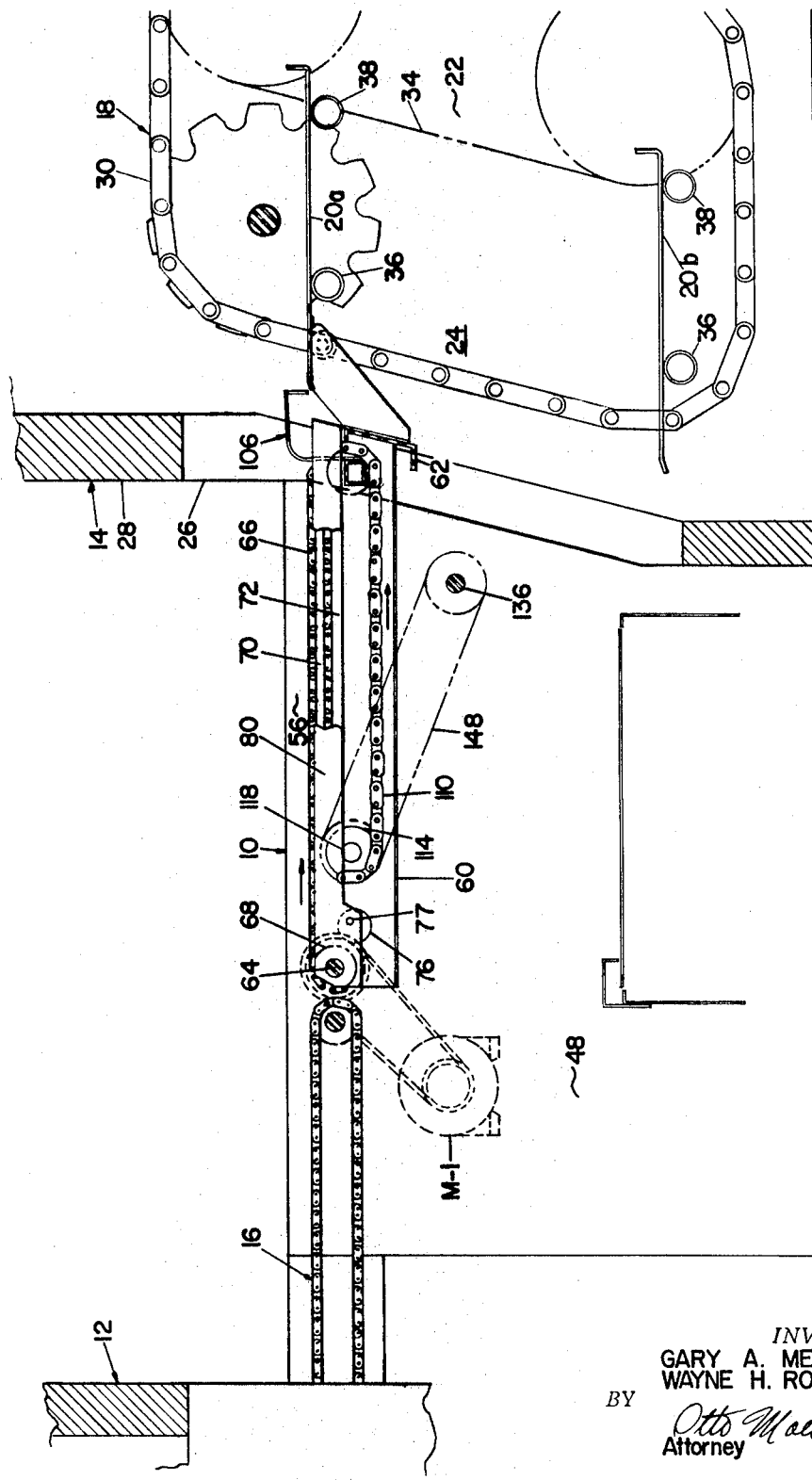
FIGURE 2 is a longitudinal vertical sectional view through the apparatus shown in FIGURE 1.

Referring to FIGURES 1 and 2 of the drawings the novel conveying and transfer apparatus, indicated as a whole by reference character 10, is disposed between the discharge end of a dough proofer 12 and the receiving end of a baking oven 14. As shown, the discharge end of the proofer 12 and the receiving end of the oven 14 are disposed in confronting spaced relation, only so much of the proofer and oven being shown as is essential to an understanding of the invention.

The proofer 12 is of well known type in which transverse rows of pans of proofed dough products are discharged from successive shelves or trays of the proofer, when such shelves or trays reach the discharge end of the proofer, onto a proofer discharge conveyor 16. In the present instance, the discharge conveyor 16 is shown as a longitudinally extending endless conveyor that delivers the successive longitudinally spaced transverse rows of pans onto the transfer apparatus 10.

The oven is provided with an endless tray conveyor 18 for conducting trays 20 in a closed circuit through the oven chamber 22, the tray conveyor including an upright run 24 in close proximity to an oven opening 26 in the oven front wall 28. The tray conveyor, illustrated rather diagrammatically in FIGURE 2, may be of any suitable type well known in the art, preferably as shown in Daniel W. Miller Patent No. 3,260,351, July 12, 1966, and includes endless chains 30, one at each side of the oven. A plurality of transversly extending equidistantly spaced trays 20 are pivotally supported at their ends by and between the chains 30, and a stabilizing chain 34 maintains the trays 20 in horizontal position as they travel upwardly along upright run 24 past the oven loading opening 26. The tray conveyor chains 30 and the stabilizing chain 34 are continuously driven from a motor, not shown, that may be conveniently located and supported, preferably between the inner and outer sheets of the oven wall near the front of the oven. Any suitable drive connecting means, not shown, may be employed for operating the tray conveyor and stabilizing chains from the motor, appropriately the means shown and described in the above referred to patent.

The trays 20 are of generally rectangular shape, comprising a pair of transversely extending longitudinally spaced front and rear tubular frame members 36 and 38, a pair of longitudinally extending side frame members 40 and 42 rigidly secured in suitable manner to and connecting the ends of the tubular members 36 and 38, and a grid type pan supporting shelf made up of a plurality of longitudinally extending laterally spaced rods or tines 44 secured in suitable manner to the tubular frame members 36 and 38. The rods or tines 44 are spaced relatively close together so that when roll or bun pans are being handled, particularly frankfurter roll pans which are formed with a plurality of longitudinally elongated narrow dough retaining depressions, the depressed retainers do not drop between the tines 44.

The transfer apparatus 10 is supported by and between a pair of laterally spaced generally rectangular housings 46 and 48 extending forwardly of the lower portion of the oven front wall 28 at opposite sides of the loading opening 26 therein. The housings 46 and 48 are made up of sheet metal, angle iron and other suitable frame elements, each including inner and outer side sheets 50 and 52 which are in effect extensions of the inner and outer sheets of the oven side walls.

The transfer apparatus 10 includes a rectangular frame 54 supporting an endless chain bed conveyor 56 spanning the space between the housings 46 and 48, the frame 54 being pivotally mounted at its end remote from the oven for oscillatable swinging movement about a transversely extending horizontal axis, as hereinafter described.

The frame 54 includes a pair of longitudinally extending laterally spaced side frame members 58 and 60 disposed respectively adjacent the confronting sides of the inner sheets 50 of the housing 46 and 48, rigidly connected at their ends adjacent the oven opening by a transversely extending channel member 62. The ends of the frame members 58 and 60 remote from the oven are freely mounted on a transversely extending rotatable shaft 64 that is journaled in suitable bearings carried by the inner sheets 50 of the housings 46 and 48. The frame 54 together with its endless chain bed conveyor 56 is thus mounted for vertical swinging movement relative to the rotatable shaft 64.

Figure 3:
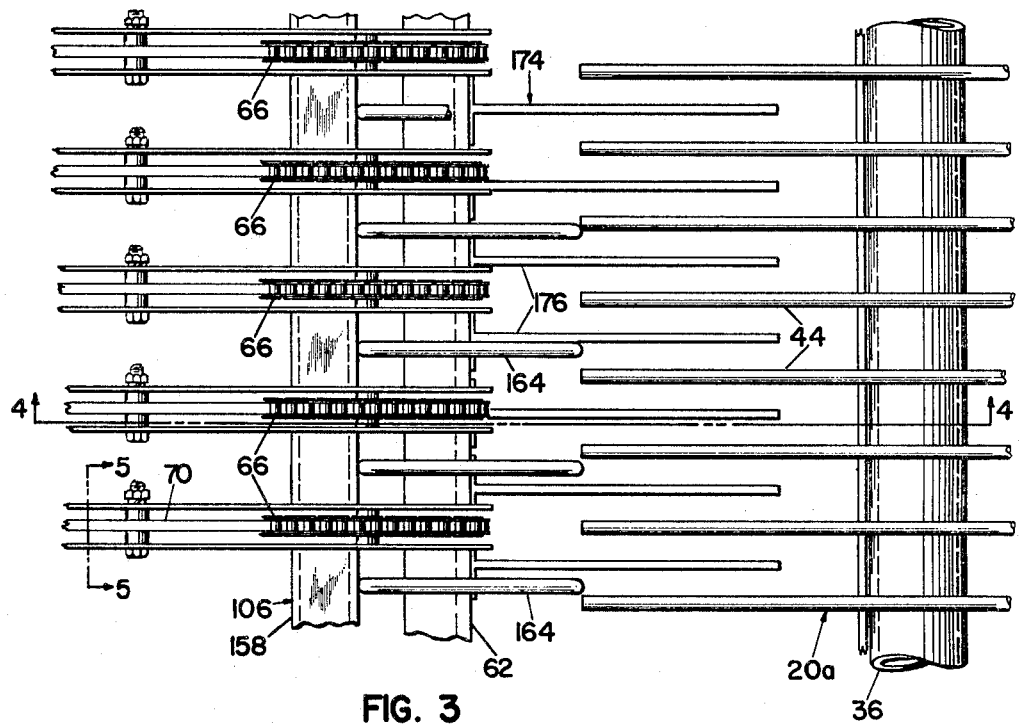
FIGURE 3 is a fragmentary enlarged plan view showing the adjacent ends of the chain bed conveyor, pusher means and a tray of the oven tray conveyor.
Figure 4:
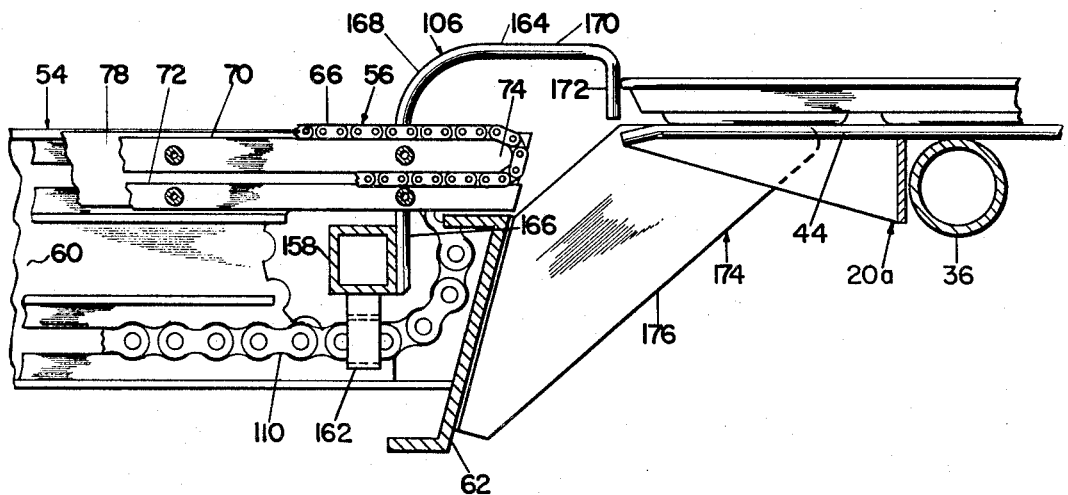
FIGURE 4 is an enlarged sectional view taken on line 4—4 of FIGURE 3.
Figure 5:
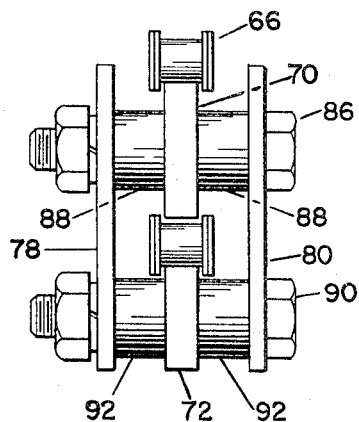
FIGURE 5 is an enlarged sectional view taken on line 5—5 of FIGURE 3.
Figure 6:
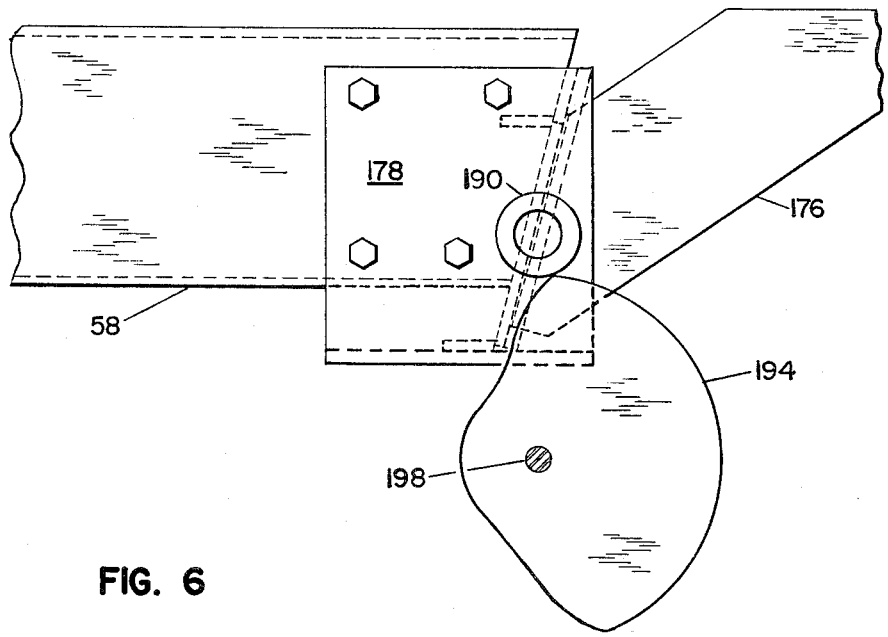
FIGURE 6 is an enlarged fragmentary side elevational view of one corner of the chain bed conveyor frame showing the cam operating means for oscillating the chain bed conveyor frame.

The endless chain bed conveyor 56 includes a plurality of longitudinally extending laterally spaced endless chains 66 trained at their ends remote from the oven around drive sprockets 68 secured, in any suitable manner, for rotation with the rotatable drive shaft 64. The upper runs of the chains 66, as shown in FIGURES 3, 4 and 5, are supported on longitudinally extending upper guide shoes 70 and the lower runs of the chains 66 are confined between the upper guide shoes 70 and longitudinally extending lower guide shoes 72. The upper guide shoes 70 at their ends adjacent the oven terminate in a rounded nose 74 preferably disposed in the oven opening 26 short of the oven chamber 22, so that the chains 66 which are trained around the terminal rounded nose portion 74 of the upper guide shoes 70 do not extend into the oven chamber 22.

The means for supporting the guide shoes 70 and 72 includes a pair of longitudinally extending plates 78 and 80 disposed in parallel vertical planes along opposite sides of each of the chains 66. The plates 78, 80 are rigidly secured at their ends adjacent the oven to the channel member 62 of the chain bed conveyor frame 54, and at their ends remote from the oven, the plates 78, 80 are provided with bearings 82, 84 freely mounted on the rotatable shaft 64, whereby the plates 78, 80 are adapted for vertical swinging movement with the chain bed conveyor frame 54 relative to the shaft 64. A plurality of transversely extending longitudinally spaced bolts 86 extend through the plates 78, 80, the upper guide shoes 70 and spacers 88 whereby the guide shoes 70 are rigidly retained midway between the plates 78, 80, as best shown in FIGURE 5. Similarly, a plurality of transversely extending longitudinally spaced bolts 90 extend through the plates 78, 80, the lower guide shoes 72 and spacers 92 whereby the lower guide shoes 72 are rigidly retained midway between the plates 78, 80.

The ends of the lower guide shoes 72 remote from the oven terminate a distance short of the sprockets 68 to provide for interposition of eccentrically mounted discs 76 over which the lower runs of the chains 66 are trained. The discs 76 are disposed between the plates 78 and 80 on shafts 77 and are arranged to be turned to any one of a number of adjusted positions for adjusting the tension on the chains 66.

The chains 66 of the chain bed conveyor 56 are driven in a direction such that the pans delivered thereto from the proofer discharge conveyor 16 are conveyed toward the oven by the top runs of the chains 66. The drive shaft 64 of the chain bed conveyor 56 is driven from a motor M-1, suitably mounted in the housing 46, through a shaft mounted gear reducer 94 on drive shaft 64 and a belt 96 trained around a sheave 98 on the motor shaft and a sheave 100 on the gear reducer shaft. The motor M-1 is arranged for intermittent operation. As will be later described in connection with the wiring diagram, FIGURE 8, motor M-1 is energized when a tray of the oven tray conveyor reaches its fully loaded position, as exemplified by tray 20a in FIGURE 2. The chains 66 of the chain bed conveyor 56 will now operate to advance therealong a row of pans delivered thereto by the proofer discharge conveyor 16, it being understood that the operation of the proofer and proofer discharge conveyor 16 are synchronized with the operation of the oven, to bring a row of pans in approximate position to be delivered onto the chain bed conveyor 56, when operation of the chain bed conveyor 56 is initiated.

The motor M-1 is arranged to be de-energized and interrupt operation of the chain bed conveyor 56 when the trailing edge of the row of pans have just cleared the beam from a light source 102 to a receiver 104 of a photoelectric cell unit as will be later described in connection with the wiring diagram, FIGURE 8. The light source 102 is supported in suitable manner on the inner side wall 50 of the compartment 48 and the receiver 104 is supported in suitable manner on the inner side wall 50 of the compartment 46 directly opposite the light source 102. The light source 102 and receiver 104 are disposed at an elevation such that the beam directed from the light source 102 to the receiver 104 is broken by a pan or row of pans in the course of their advancement by the chain bed conveyor 56. The light source 102 and receiver 104 are also so disposed between the receiving and discharge ends of the chain bed conveyor 56 to provide a space between the receiving end of the chain bed conveyor 56 and the light beam substantially greater than the length of the longest pan, to be handled, and a space between the discharge end of the chain bed conveyor 56 and the light beam approximately equal to the length of the longest pan to be handled.

A row of pans that has been advanced by the chain bed conveyor 56 to a position wherein it just clears the light beam from light source 102 to the receiver 104, is pushed from the now stopped chain bed conveyor 56 onto an oncoming tray of the oven tray conveyor by a pusher indicated as a whole by reference numeral 106. The operating means for the pusher 106 includes a pair of longitudinally extending laterally spaced endless chains 108 and 110 at opposite sides of the chain bed conveyor 56, arranged to be supported by respective side frame members 58 and 60 of the chain bed conveyor frame 54. At their ends remote from the oven, chains 108 and 110 are trained around sprockets 112 and 114 fixed on stub shafts 116 and 118 that are journaled in bearings 120 and 122 carried by the chain bed conveyor side frame members 58 and 60. At their ends proximate the oven, chains 108 and 110 are trained around sprockets 124 and 126 rotatably supported in suitable manner from chain bed conveyor side frame members 58 and 60. The sprockets 112, 114 and 124, 126 are constructed and arranged so that the upper and lower runs of the chains 108 and 110 are disposed in planes parallel to but below the plane of the upper run of the chain bed conveyor chains 66, and longitudinally considered are disposed between the ends of the chain bed conveyor chains 66.

The chains 108 and 110 are driven in timed relation with the travel of the endless oven tray conveyor 18 and are driven in a direction such that the lower runs travel forwardly toward the oven and the upper runs travel rearwardly away from the oven, as indicated by the directional arrow in FIGURE 2. The driving means includes a transversely extending through shaft 136 disposed below the chains 108 and 110 journaled in bearings 138 and 140 carried by the inner side sheets 50 of the housings 46 and 48. A sprocket chain 142 is trained around a sprocket 144 fixed on one end of the shaft 136 within the housing 46 and a sprocket (not shown) fixed on a rotatable shaft (not shown) of the oven tray conveyor 18 whereby the through shaft 136 is driven from and in timed relation with the oven tray conveyor 18. Sprocket chains 146 and 148 trained around the sprockets 150 and 152 fixed on opposite ends of through shaft 136 and also trained around sprockets 154 and 156 fixed on the stub shafts 116 and 118 complete the drive from the tray conveyor 18 to the pusher chains 108 and 110. The relative sizes of the various sprockets are such that the chains 108 and 110 make one complete circuit for each travel of the tray conveyor 18 through one tray pitch.

The pusher 106 includes a transversely extending bar 158, preferably hollow and rectangular in cross section, rigidly secured at its end to brackets 160 and 162 formed with or rigidly secured to an inner link of respective chains 108 and 110 and extending inwardly of the chain loops so that the pusher bar 158 is disposed substantially midway between the upper and lower runs of the chains 108 and 110. A plurality of generally gooseneck shaped transversely spaced pusher fingers 164 are welded or otherwise rigidly secured at one of their respective ends to the pusher bar 158.

Considering the finger supporting bar 158 as traveling along the lower runs of the chains 108 and 110, the fingers 164 include a vertical portion 166 extending upwardly from the bar 158, as best shown in FIGURE 4, to approximately the plane of the chain bed conveyor 56, an upwardly and forwardly extending arcuate portion 168 projecting above the said plane, a horizontally forwardly extending portion 170, and a terminal pan engaging portion 172 extending downwardly to said plane. The fingers 164 are laterally spaced along the length of the bar 158 so that they project upwardly between the chain bed conveyor chains 66. The pan engaging portions 172 of the fingers 164 are disposed a distance forward of the links of the chains 108 and 110 from which the pusher 106 is supported, such that when the supporting links are at the forward ends of the lower runs of the chains 108 and 110, referring particularly to FIGURES 3 and 4, the pans will be pushed off the chain bed conveyor chains 66 onto a grid 174. The grid 174 is made up of a plurality of thin plates 176 suitably secured to the channel member 62 of the chain bed conveyor frame 54 and that extend forwardly therefrom in longitudinally extending transversely spaced parallel vertical planes in interfingered relation with respect to the rods or tines 44 of the oven trays 20 as the latter move upwardly along upright run 24 past the oven loading opening 26 to pick the pans off the grid 174.

It is to be noted that with the above construction and arrangement of elements, the plates 176 of the grid 174 as a practical matter can be and are of substantially less thickness than the width of the chains 66, so that considerably greater tolerance is provided between the interfingered plates 176 and the tray rods 44 than if the chains 66 were arranged for extension in interfingered relation with the tray rods, thereby minimizing the possibility of a jamb occurring. Furthermore, in the present construction the chains 66 do not have to be and are not in alinement with the spaces between the tray rods 44, whereby fewer chains may be used while still maintaining sufficiently close spacing between the chains 66 to prevent the depressed portions of bun pans from dropping into the spaces between the chains. Additionally, the chains 66 are retained out of the heat of the baking chamber 22.

As previously noted, the chain bed conveyor frame 54 is pivotally mounted on shaft 64 for oscillatable swinging movement. For this purpose the rearward ends of the side frame members 58 and 60 adjacent the oven have rigidly secured thereto laterally outwardly extending corner brackets 178 and 180 projecting through openings 182 and 184 in the inner side sheets 186 and 188 of the oven side walls at opposite sides of the oven opening 26. At their free ends, the brackets 178 and 180 carry rotatable cam follower rollers 190 and 192 arranged to be engaged by cams 194 and 196 for imparting oscillatable swinging movement to the transfer apparatus 10. The cams 194 and 196 are fixed on the ouput shafts 198 and 200 of gear reducers 202 and 204 suitably mounted in the lower front end of the oven between the inner and outer sheets of the oven side walls. The gear reducers 202 and 204, through which the cams 194 and 196 are rotated, are operatively connected with the through shaft 136 by sprocket chains 206 and 208 trained around sprockets 210 and 212 on opposite ends of through shaft 136 and sprockets 214 and 216 on the input shafts 218 and 220 of gear reducers 202 and 204. The transfer apparatus 10 is thus oscillated in timed relation with travel of the oven tray conveyor 18, the transmission means just described being such that cams 194 and 196 make one revolution for each travel of tray conveyor 18 through one tray pitch.

Figure 7A:
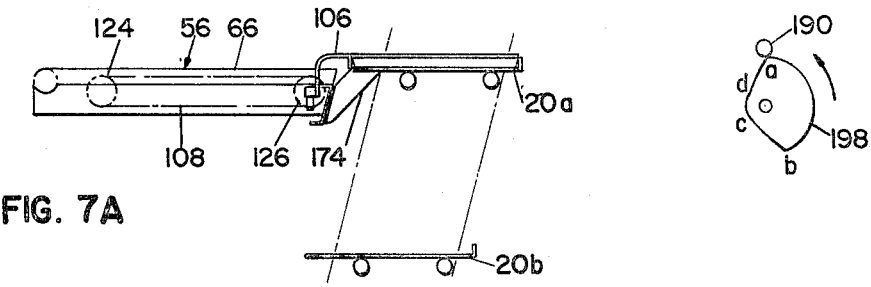
FIGURES 7A, 7B, 7C and 7D are diagrammatic views showing the relative positions of the oscillatable chain bed conveyor, the pan pusher means, the trays of the oven tray conveyor and the cam for oscillating the chain bed conveyor during one cycle of operation.

Assuming for purpose of illustration that a tray travels through one tray pitch in 18 seconds so that cams 194 and 196 make one revolution in 18 seconds, and referring now to FIGURES 6 and 7A–7D, cam 194 (and this applies also to cam 196) is provided with an arcuate high portion $a$–$b$ having an extent that retains the conveyor bed 56 in horizontal position for approximately 8 seconds. The cam 194 is fixed on the shaft 198 in position such that the leading point $a$ of the high portion $a$–$b$ is engaged by the cam follower roller 190 substantially coincident with arrival of a tray 20 in its loaded position, or in other words when the tray 20 and the chain bed conveyor 56 are in substantial horizontal alinement, as shown in FIGURES 2 and 7A. At this time the pusher 106, which is affixed to the chains 108, 110 and operates in timed relation with the oven tray conveyor 18 to complete one circuit of travel for each travel of the oven tray conveyor 18 through one tray pitch, as previously described, is arranged to be in the position shown in FIGURES 2 and 7A, having just completed loading a row of pans on tray 20a. Also, with the arrival of tray 20a in its loading position, operation of the conveyor bed chains 66 is initiated, as previously described, to advance a succeeding row of pans.

Figure 7B:
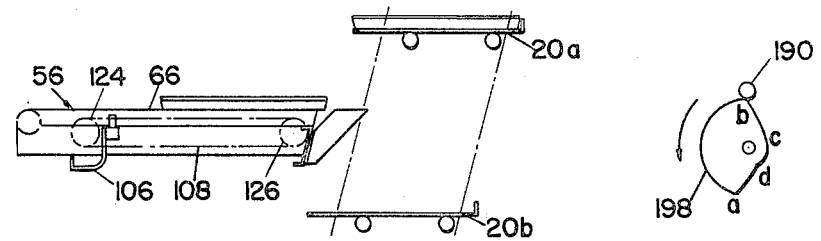

Now, when the cam 194 has rotated from the position shown in FIGURE 7A to the position shown in FIGURE 7B, during which time engagement of the high portion $a$–$b$ of cam 194 with cam follower roller 190 has retained the chain bed conveyor 56 in horizontal position, the succeeding row of pans will have been advanced to a position in which their trailing edges just clear the light beam from light source 102 to the receiver 104, whereupon operation of the chains 66 of the chain bed conveyor 56 is interrupted, as previously described, with the said succeeding row of pans in substantially the position shown in FIGURE 7B. The trays 20a and 20b will during this time have been moved a proportional distance from their positions as shown in FIGURE 7A to their positions as shown in FIGURE 7B. The tray 20b will have had the pans of baked product removed therefrom at this time, any suitable means, well known in the art and therefore not shown in the drawings, being employed for this purpose. At the same time, as the links of the chains 108 and 110, to which the pusher 106 is relatively immovably affixed, turn through an arc of 180° in going around the sprockets 124 and 126, the pusher 106 swings away from the row of pans that have been loaded onto tray 20a in a descending 180° arc to an inverted position and then travels in such inverted position with the upper runs of the chains 108 and 110 below the oncoming succeeding row of pans, from the position shown in FIGURE 7A to the position shown in FIGURE 7B.

Figure 7C:
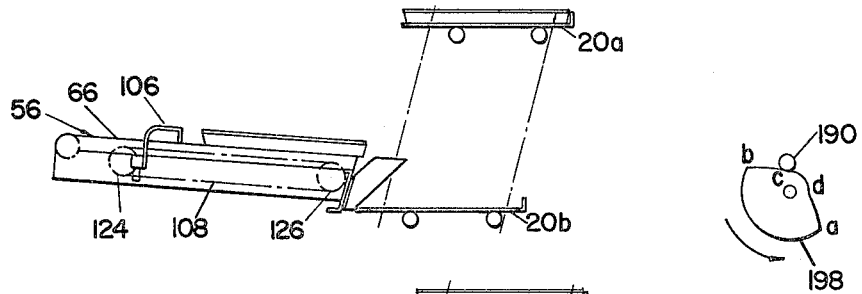

The cam 194 is provided with a descending sloped portion $b$–$c$, the slope and extent of which is such that when cam 194 is rotated from the position shown in FIGURE 7B to the position shown in FIGURE 7C, engagement therewith by cam follower roller 190 effects downward swinging movement of the chain bed conveyor 56 through an angle of approximately 3 degrees in about 3 seconds, assuming again an 18 second cycle. Empty tray 20b will now have been raised to a position somewhat below the level of the free end of the grid 174 while the pusher 106 will have been moved from inverted position on the upper runs of chains 108, 110 as shown in FIGURE 7B to an upright position on the lower runs of chains 108, 110 as shown in FIGURE 7C to engage the succeeding row of pans on the chain bed conveyor 56.

Figure 7D:
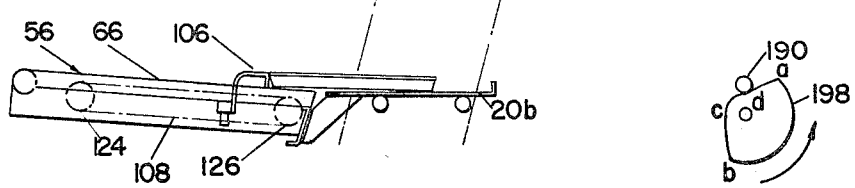

The cam 194 is provided with an arcuate low portion $c$–$d$ and as the cam 194 rotates from the position shown in FIGURE 7C to the position shown in FIGURE 7D, engagement therewith by cam follower roller 190 retains the chain bed conveyor 56 in its downwardly sloped position, the extent of the cam portion $c$–$d$ being such that the chain bed conveyor remains in its sloped position for about 4 seconds. During this time the pusher 106 will have advanced a distance to push pans of the shortest length to be handled to the position shown in FIGURE 7D whereby the leading edge of such short pans will be substantially at the free ends of the grid 174 and the empty tray 20b will have been raised to a position level with the free end of the grid 174, so that a smooth transfer of pans to the tray is provided for. If pans of a greater length are being handled, as illustrated in FIGURES 7A to 7D, the leading edge of such pans will be pushed onto the tray 20b while the tray 20b is being raised from the position shown in FIGURE 7C to the position shown in FIGURE 7D, so that irrespective of the length of the pans being handled, a smooth transfer to the tray 20b is provided for.

The cam 194 is provided with an ascending sloped portion $d$–$a$ the slope and extent of which is such that engagement therewith by cam follower 190 raises the chain bed conveyor 56 in coincidence with elevation of the tray 20b in the remaining 3 seconds of the 18 second cycle, from their positions as shown in FIGURE 7D to their positions as shown in FIGURE 7A. During this time pusher 106 will have moved from its position as shown in FIGURE 7D to its position as shown in FIGURE 7A to push the aforementioned succeeding row of pans onto the tray 20b. One cycle of operation has now been completed and the next cycle is ready to start.

Figure 8:
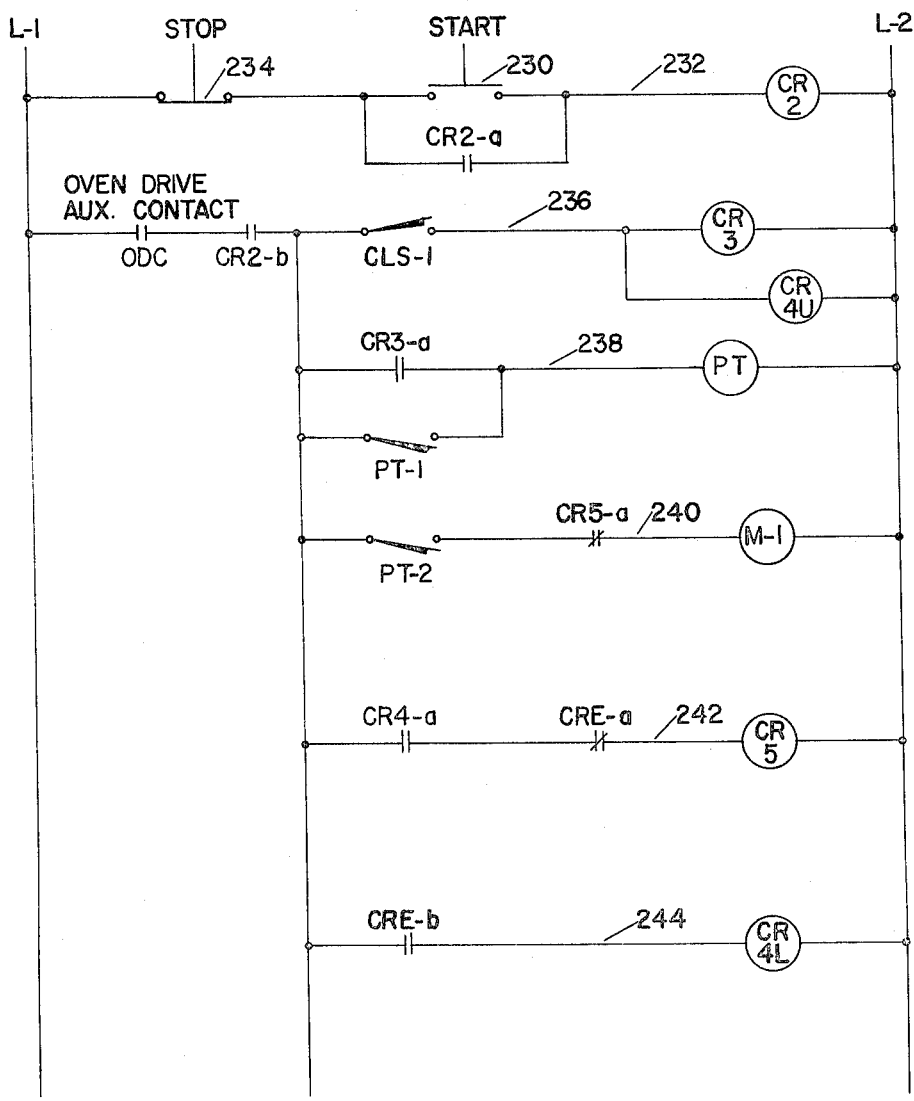
FIGURE 8 is a schematic diagram of an exemplary electrical control system.

Referring in particular to the wiring diagram FIGURE 8, the transfer apparatus is initiated by closing a normally open start switch 230 interposed in line 232 connected to power lines L–1 and L–2. Closing of start switch 230 energized start control relay CR2 thereby closing its normally open contact CR2–$a$ to maintain start control relay CR2 energized upon release of normally open start switch 230 and which remains energized until the normally closed stop switch 234 is opened. Energization of start control relay CR2 also closes its normally open contact CR2–$b$ in line 236. Assuming now that the tray conveyor motor (not shown) is operating to continuously drive the oven tray conveyor 18, an oven drive auxiliary contact ODC in line 236 is also closed.

When a tray 20 reaches its loaded position adjacent the oven opening, or in other words reaches the position shown occupied by tray 20a in FIGURE 1, it momentarily closes a normally open cam limit switch CLS–1 in line 236 energizing a control relay CR3 and the unlatching coil CR4–$u$ of a mechanical latch control relay CR4. Energization of control relay CR3 closes a normally open contact CR3–$a$ in line 238 and energizes a program timer PT. Operation of the program timer PT closes the normally open program timer switch PT–1 and maintains the program timer energized when momentarily closed contact CR3–$a$ re-opens. Operation of the program timer PT also closes the normally open program timer switch PT–2 in line 240 which includes a normally closed contact CR5–$a$ of a control relay CR5 for energizing the chain bed conveyor motor M–1.

The control relay CR5 controlling the contact CR–5a is disposed in a line 242 in which is also interposed a normally open contact CR4–$a$ of mechanical latch control relay CR4 and a normally closed contact CRE–$a$ of a control relay of the previously mentioned photoelectric cell 104. The photoelectric cell 104, as also previously pointed out, is of a type that is energized when the beam from the light source 102 is interrupted and is de-energized when the beam from the light source 102 is uninterrupted.

When the unlatching coil CR4–$u$ was momentarily energized, as above noted, it opened contact CR4–$a$ which previously was latched closed, and it will remain open upon de-energization of unlatching coil CR4–$u$. Since there is no pan interrupting the light beam, photoelectric cell 104 remains de-energized and its normally closed contact CRE-*a* remains closed. With contact CRE-*a* closed but with contact CR4-*a* open, the line 242 to control relay CR5 is broken and with control relay CR5 now de-energized, its normally closed contact CR5-*a* is closed. With contact CR5-*a* now closed and the program timer switch PT-2 now also closed, the line 240 to motor M-1 is completed, whereupon the chains 66 of the chain bed conveyor 56 are placed in operation.

Now, with another row of pans being delivered from the proper discharge conveyor 16 to the chain bed conveyor 56, they will be advanced by the chains 66 of the chain bed conveyor 56. When the leading edge of this row of pans interrupts the light beam to photoelectric cell 104, the photoelectric cell is energized to cause its contact CRE-*b* in line 244 to close and thereby energize the latching coil CR4-L of mechanical latch control relay CR4. Energization of latching coil CR4-L latches contact CR4-*a* in line 242 into closed position. However, energization of photoelectric cell 104 has caused its contact CRE-*a* to open, so that control relay CR5 remains de-energized. Consequently contact CR5-*a* remains closed and with program timer switch PT-2 also still closed, motor M-1 remains energized to maintain the chains 66 of the chain bed conveyor 56 in operation.

Now, when the row of pans has been advanced to a point where the pans no longer intercept the light beam, the photoelectric cell 104 is de-energized. De-energization of the photoelectric cell causes its contact CRE-*a* to reclose and with contact CR4-*a* latched in closed position at this time, as described above, the line 242 to control relay CR5 is completed. Energization of control relay CR5 opens its normally closed contact CR5-*a* in line 240 to de-energize motor M-1, thereby stopping the operation of the chains 66 of the chain bed conveyor 56. The row of pans is now in position to be engaged by the pusher 106 and to be pushed from the chain bed conveyor 56 onto an oncoming tray of the oven tray conveyor 18 as previously described. When the oncoming tray has reached the position shown occupied by tray 20*a* in FIGURE 1, at which position loading has been completed, cam limit switch CLS-1 is again momentarily closed and another cycle is initiated.

We claim:

1. A transfer device for moving articles from a first article support onto an adjacent second article support including:
   a pair of parallel laterally spaced endless members defining closed loops having upper and lower runs with said lower runs disposed below the plane of said first article support;
   means for unidirectionally driving said endless members in a direction such that the lower runs travel toward said second article support;
   article engaging means;
   means mounting said article engaging means on said endless members for movement therewith and in fixed relation with respect thereto; and
   said article engaging means extending from said mounting means in a direction inwardly of said endless member loops and for a distance such that said article engaging means projects above the plane of said first article support as said mounting means travels along the lower runs of said endless members for pushing articles from said first article support onto said second article support.

2. A transfer device for slidingly moving articles from a first article support onto an adjacent second article support including:
   a pair of parallel laterally spaced endless chains disposed below said first support defining closed loops having upper and lower runs with said lower runs disposed in a plane parallel with the plane of said first article support;
   means for unidirectionally driving said chains in a direction such that the lower runs travel toward said second article support;
   article engaging means;
   means mounting said article engaging means on said endless chains for movement therewith and in fixed relation with respect thereto; and
   said article engaging means extending from said mounting means in a direction inwardly of said chain loops and for a distance such that said article engaging means projects above the plane of said first article support as said mounting means travels along the lower runs of said chains for pushing articles from said first article support onto said second article support.

3. The transfer device as set forth in claim 1 wherein said first support includes a plurality of laterally spaced longitudinally extending support members and wherein said article engaging means includes a plurality of laterally spaced fingers adapted to project upwardly between said support members as said mounting means travels along the lower runs of said endless members.

4. In combination:
   a tray conveyor having spaced apart trays thereon movable upwardly along an upright run forming an end of a closed conveyor circuit;
   an article support adjacent said upright tray conveyor run;
   endless driven means disposed below said article support defining a closed loop having upper and lower runs with said lower run disposed in a plane parallel with the plane of said article support;
   means for unidirectional driving said endless driven means in a direction such that the lower runs travel toward said upright tray conveyor run;
   article engaging means;
   means mounting said article engaging means on said endless driven means for movement therewith and in fixed relation with respect thereto; and
   said article engaging means extending from said mounting means in a direction inwardly of said endless driven means loop and for a distance such that said article engaging means projects above the plane of said article support as said mounting means travels along the lower run of said endless driven means for pushing articles from said article support onto said trays of said tray conveyor.

5. A transfer device for slidingly moving articles from a first article support onto an adjacent second article support;
   said first support including a plurality of laterally spaced longitudinally extending support members;
   said transfer device including a pair of parallel laterally spaced endless chains disposed below said first support defining closed loops having upper and lower runs with said lower runs disposed in a plane parallel with the plane of said first article support;
   means for unidirectionally driving said chains in a direction such that said lower runs travel toward said second article support;
   article engaging means;
   means mounting said article engaging means on said endless chains for movement therewith and in fixed relation with respect thereto;
   said mounting means including brackets secured to the confronting sides of said pair of endless chains extending inwardly of the loops of said endless chains, and a transversely extending bar disposed in a plane between the planes of the upper and lower runs of said endless chains secured at its ends to the free ends of said brackets; and
   said article engaging means including a plurality of laterally spaced fingers rigidly secured to said bar and extending therefrom between and above the plane of said laterally spaced longitudinally extending support members of said first support as said mounting means travels along the lower runs of said endless chains for pushing articles from said first article support onto said second article support.

6. In combination:
an endless longitudinally extending tray conveyor having equidistantly spaced apart trays thereon and including an upright upwardly traveling run at one end thereof;

means for operating said tray conveyor;

a conveyor bed adjacent said upright tray conveyor run including a plurality of parallel laterally spaced longitudinally extending endless chains defining closed loops having upper conveying runs;

means for intermittently driving said chains to advance successive transverse rows of articles therealong toward said upwardly traveling tray conveyor run to an arrested position on the discharge end thereof;

a pair of parallel laterally spaced endless members defining closed loops having upper and lower runs with said lower runs disposed below the plane of the conveying runs of said conveyor bed chains;

article engaging means;

means mounting said article engaging means on said endless members for movement therewith and in fixed relation with respect thereto;

said article engaging means extending from said mounting means in a direction inwardly of said endless member loops and for a distance such that said article engaging means project between and above the plane of the upper conveying runs of said conveyor bed chains as said mounting means travels along the lower runs of said endless members; and means for driving said endless members in timed relation with said tray conveyor and in a direction such that said article engaging means pushes successive transverse rows of arrested articles from the discharge end of said conveyor bed onto successive trays of said tray conveyor.

7. In combination:
an endless longitudinally extending tray conveyor having equidistantly spaced apart trays thereon and including an upright upwardly traveling run at one end thereof;

means for continuously operating said tray conveyor;

an endless conveyor adjacent said upright run of said tray conveyor for advancing spaced successive transverse rows of articles toward said upright tray conveyor run;

means mounting said endless conveyor at its end remote from said upright tray conveyor run for pivotal swinging movement about a horizontal transversely extending axis;

means operated in timed relation with said tray conveyor for effecting during each travel of a tray through one tray pitch downward swinging movement of said endless conveyor from horizontal to downwardly sloping position to meet successive oncoming trays, upward swinging movement thereof from said downwardly sloping to its horizontal position in coincidence with successive trays and a dwell thereof in said horizontal position;

means responsive to alignment of said endless conveyor and a tray of said tray conveyor in horizontal position to initiate operation of said endless conveyor to advance a row of articles therealong to the discharge end thereof during said dwell;

means responsive to advance of a row of articles to said discharge end of said endless conveyor for interrupting operation thereof;

longitudinally extending endless chain means at opposite sides of said endless conveyor;

pusher means carried by and between said endless chain means; and means driving said endless chain means in timed relation with said tray conveyor to effect transfer by said pusher means of a row of articles disposed on the discharge end of said endless conveyor onto a tray of said tray conveyor during said upward swinging movement of said endless conveyor in coincidence with a tray.

8. A transfer device for moving articles from a first article support onto an adjacent registering second article support:

said first support including a plurality of parallel laterally spaced longitudinally extending endless chains defining closed loops having upper conveying runs adapted to convey articles therealong toward said second article support and lower return runs;

drive means for said endless chains;

means interrupting operation of said drive means upon conveyance of an article by said endless chains to a position adjacent the discharge end of said first article support to arrest further advance thereof;

a pair of parallel laterally spaced endless members defining closed loops having upper and lower runs with said lower runs disposed below the plane of the upper runs of the endless chains of said first article support;

means for continuously and unidirectionally driving said endless members in a direction such that the lower runs travel toward said second article support;

article engaging means;

means mounting said article engaging means on said endless members for movement therewith and in fixed relation with respect thereto;

said article engaging means extending from said mounting means in a direction inwardly of said endless member loops and for a distance such that said article engaging means projects above the plane of the upper runs of the endless chains of said first article support as said mounting means travels along the lower runs of said endless members for pushing successive articles from said arrested position on said first article support; and means for reactivating operation of said endless chain drive means when said article engaging means has completed its pushing stroke, to advance a succeeding article during the return stroke of said article engaging means.

9. In combination:
an endless longitudinally extending tray conveyor having equidistantly spaced apart trays thereon and including an upright upwardly traveling run at one end thereof;

means for continuously operating said tray conveyor;

a conveyor bed adjacent said upright tray conveyor run including a plurality of parallel laterally spaced longitudinally extending endless chains defining closed loops having upper conveying runs;

means for driving said endless chains in a direction to convey articles toward said upright tray conveyor run on said upper conveying runs;

means interrupting operation of said endless chains upon conveyance of an article to a position adjacent the discharge end of said conveyor bed to arrest further advance thereof;

a pair of parallel laterally spaced endless members defining closed loops having upper and lower runs with said lower runs disposed below the plane of the upper chain conveying runs of said conveyor bed;

means for driving said endless members in timed relation with said tray conveyor and in a direction such that the lower runs travel toward said tray conveyor;

article engaging means;

means mounting said article engaging means on said endless members for movement therewith and in fixed relation with respect thereto;

said article engaging means extending from said mounting means in a direction inwardly of said endless member loops and for a distance such that said article engaging means projects above the plane of the upper runs of the endless chains of said conveyor bed as said mounting means travels along the lower runs of said endless members for pushing successive articles from said arrested position on said conveyor bed onto successive trays of said tray conveyor; and means for reactivating operation of said endless chains upon completion of each pushing stroke of said article engaging means, to advance a succeeding article during the return stroke of said article engaging means.

10. In combination:

an endless longitudinally extending tray conveyor having equidistantly spaced apart trays thereon and including an upright upwardly traveling run at one end thereof;

a pan support adjacent said upright tray conveyor run;

means mounting said pan support at its end remote from said upright tray conveyor run for pivotal swinging movement about a horizontal transversely extending axis;

means operated in timed relation with said tray conveyor controlling swinging movement of said pan support from a horizontal position to a downwardly sloping position to bring the forward end of said pan support in position to meet a tray on said upright tray conveyor run and from said downwardly sloping position to a horizontal position to raise the free end of said pan support in coincidence with elevation of said tray on said upright tray conveyor run;

a pair of parallel laterally spaced endless chains mounted for swinging movement with said pan support and disposed therebelow, said chain defining closed loops having upper and lower runs with said lower runs disposed in a plane parallel with the plane of said pan support;

means for unidirectionally driving said chains in a direction such that the lower runs travel toward said upright tray conveyor run;

pan engaging means;

means mounting said pan engaging means to said endless chains for movement therewith and in fixed relation with respect thereto;

said pan engaging means extending from said mounting means in a direction inwardly of said chain loops and for a distance such that said pan engaging means projects above the plane of said pan support as said mounting means travels along the lower runs of said chains for pushing pans from said pan support onto said trays;

said pan engaging means being operated by said chains in timed relation with said tray conveyor to push pans from said pan support onto said trays during said coincidental raising of the free end of said pan support and elevation of said trays.

References Cited

UNITED STATES PATENTS 3,174,612   3/1965   Jones _____ 198—20

EDWARD A. SROKA, *Primary Examiner.*